United States Patent [19]

Staats

[11] 4,008,305
[45] Feb. 15, 1977

[54] METHOD OF MANUFACTURING A BOOK BINDING ELEMENT

[75] Inventor: Henry N. Staats, Deerfield, Ill.

[73] Assignee: General Binding Corporation, Northbrook, Ill.

[22] Filed: Apr. 16, 1975

[21] Appl. No.: 568,548

Related U.S. Application Data

[62] Division of Ser. No. 169,981, Aug. 9, 1971, abandoned.

[52] U.S. Cl. .............................. 264/336; 264/230; 264/299; 264/328
[51] Int. Cl.² .......................................... B29C 7/00
[58] Field of Search .......... 264/230, 299, 328, 339, 264/336

[56] References Cited
UNITED STATES PATENTS

| | | | |
|---|---|---|---|
| 2,978,532 | 4/1961 | Burnett | 264/328 X |
| 3,433,688 | 3/1969 | Staats | 264/230 X |
| 3,455,336 | 7/1969 | Ellis | 264/230 |
| 3,899,564 | 8/1975 | Kessler | 264/328 X |
| 3,917,789 | 11/1975 | Heisler | 264/328 X |

*Primary Examiner*—Richard R. Kucia
*Attorney, Agent, or Firm*—Hill, Gross, Simpson, Van Santen, Steadman, Chiara & Simpson

[57] ABSTRACT

A novel ring binder for securing a plurality of perforated sheets in a loose-leaf fashion, wherein the ring element is generally circular and has a generally radial slit permitting it to open for the insertion of sheets, and wherein the terminal ends of the ring are each provided with radially inwardly directed projections whereby individual sheets of bound paper are restrained against ready removal from the ring; a novel method of manufacturing such rings is also provided.

4 Claims, 5 Drawing Figures

U.S. Patent  Feb. 15, 1977  4,008,305
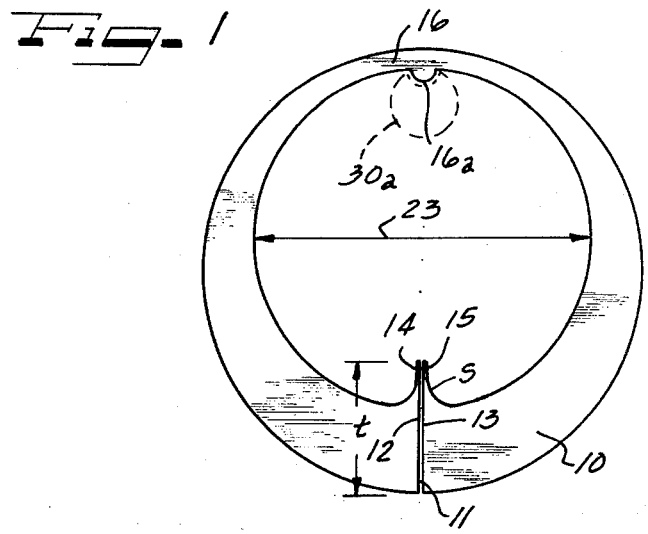
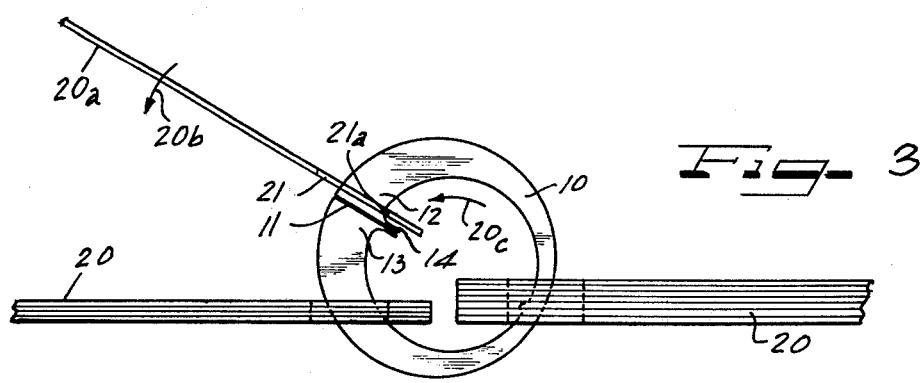
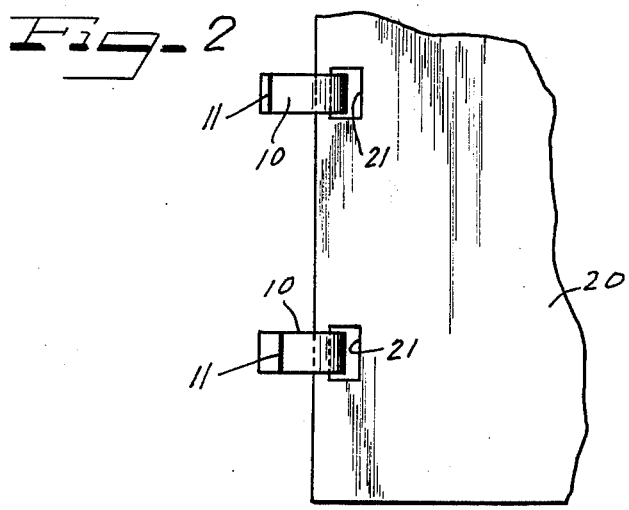
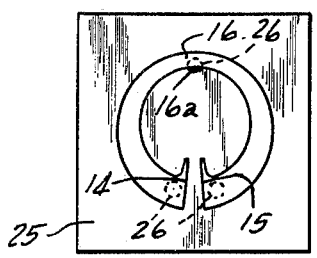
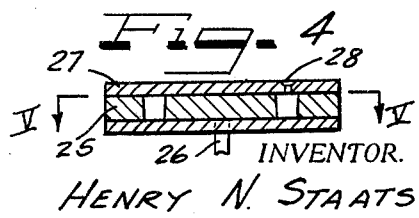
INVENTOR.
HENRY N. STAATS
BY Hill, Sherman, Meroni, Gross & Simpson ATTORNEYS

METHOD OF MANUFACTURING A BOOK BINDING ELEMENT

This is a division of application Ser. No. 169,981 filed Aug. 9, 1971 and now abandoned.

BACKGROUND OF THE INVENTION

The present invention relates to the binding of a plurality of sheets of paper, or the like, having aligned peripheral apertures. In typical practice of today, plastic binding elements mainly comprise curved flat plastic fingers attached to a longitudinally extending backbone element and arranged to cooperate with a plurality of generally rectangular pre-punched apertures along one edge of the paper. The desirability of a completely lie-flat binding element for such articles as calendars, and the like, has made it desirable to provide one or more rings entirely separate from any backbone. Further, an examination of the problem of binding books in a looseleaf manner at extremely high speed has been reviewed and prior art systems, particularly those employing the integral backbone and finger-binding elements have been found operating now at a low but nearly maximum rate.

Such prior art integral backbone and finger binding elements are conventionally applied to a preformed perforated sheet by the spreading of all of the backbone fingers simultaneously with the transverse motion of the perforated sheets into position in the binding, followed by release of all of the fingers and simultaneous engagement with all of the apertures of the sheets being bound. In accordance with the present invention, however, the perforated sheets being bound may be introduced into the apparatus from a direction parallel to the line of perforations along the edge of the sheets and individual rings inserted sequentially as the book passes through the apparatus. As a result of the sequential binding with a plurality of single rings, the speed of binding is tied only to the edgewise speed of the book conveyor, and, accordingly, I have found that the capability of extremely high-speed bookbinding has been increased by at least 100% over previously known plastic binding systems.

While prior art binding has on occasion been accomplished by a ring element having a radial slot, the effective closure of the slot in an effective manner has not, to my knowledge, been successfully accomplished. In accordance with the present invention, the radial slot provided in the manufacture of the ring binder is substantially completely closed inherently and mechanical interlock means are provided in the ring construction to physically prevent disassembly of sheets in normal use.

SUMMARY OF THE INVENTION

In accordance with the present invention, a method produces a ring binding element which has a radial slit in one side thereof parallel to the axis of curvature of the ring. The slit is normally closed and the plastic ring has the characteristic that following insertion of the paper or other element being bound, the resiliency of the plastic material of the ring will cause the ring binding element to close in an essentially permanent manner. The ring, which will on occasion herein be termed a C-ring, provides, in its operation, a structure extremely resistant to page removal. Mechanical interlocks or projections are provided on each of the ends of the C-ring, facing radially inwardly and forming, in effect, inwardly turned hooks. In operation, the inwardly turned hooks project into an interference relation with the individual sheets of paper confined by the ring such that upon flipping the sheet of paper, such as in turning the pages of a booklet, movement of the sheet will catch the projection and rotate the ring as continued movement of the sheet occurs. Thus, rather than having a sheet slip through the radial slot and become disassociated with the remainder of the bound sheets on the ring, the inwardly directed projections have been found to eliminate, substantially completely, any tendency of the sheets to become aligned with and pass through the radial slit.

In accordance with the method of this invention, the C-ring is molded in a mold cavity taking the shape of the C-ring in its final configuration except for an initial opening of the ring approximating 0.015 inch. This spacing has been found to close upon ejection of the ring from the mold, and when so closed stays permanently closed such that typical bound sheets do not readily pass through the slit.

DESCRIPTION OF THE DRAWINGS

FIG. 1 shows an end-elevational view of a C-ring constructed in accordance with the present invention;

FIG. 2 shows a plan elevational view of a plurality of rings illustrated in FIG. 1 in position in a bound book;

FIG. 3 is an end-elevational view of the C-ring of the present invention in operation;

FIG. 4 is a cross-sectional view of a mold cavity employed in the manufacture of C-rings of the present invention; and FIG. 5 is a plan view of the cavity taken along line V—V of FIG. 4.

DETAILED DESCRIPTION

As may be seen from a consideration of the drawings, and with particular reference to FIG. 1, the C-ring of the present invention comprises a main body 10 in a generally circular configuration. A radial slit 11 is provided between the ends 12 and 13 of the body 10 and, the ends 12 and 13 are provided with inwardly directed projections 14 and 15 respectively. For reasons more fully explained below, the thickness of the ends 12 and 13 is substantially greater than the thickness of the back 16 of the ring.

In use, the ring 10 is employed for fastening a plurality of sheets 20 in a looseleaf, freely pivotal, relationship. As can be seen clearly from FIG. 2, the sheets 20 are provided with one or more apertures 21 having a length greater than the axial length of the individual C-rings 10. The sheets 20 may be placed upon the ring by manually separating the ends 12,13 by springing them apart and inserting the sheets. Release of the sprung ends 12,13 will automatically permit the closure of the ring. Although the drawings illustrate the ends 12,13 somewhat separated, in actual practice, it is preferred that they be touching and in typical examples, I have found that the ends 12,13 do in fact touch in most instances. However, as is generally known, a typical sheet of writing paper approximates 0.003 of an inch in thickness, while many bound materials are substantially thicker. Accordingly, slight separation of the ends 12,13 will not, in normal operation, create a problem until the separation exceeds the thickness of the materials being bound. Moreover, even in the event of slightly larger separation, however, the specific structural design of the C-ring of the present invention substantially prevents inadvertent separation of the sheets from the C-ring binding.

As can be seen from a consideration of FIG. 3, sheets 20, may readily be pivoted, such as illustrated by sheet 20a in FIG. 3. Sheet 20a has been pivoted counterclockwise, in the direction of the arrows 20b and 20 c from a position overlying the sheets 20 on the right hand of FIG. 3. As the sheet 20a has been pivoted in a counterclockwise fashion, the edge 21a of opening 21 thereof has contacted the inwardly hooked projection 14 of the end 12 and has caused the ring to rotate in the direction of the arrow 20c, along with the sheet 20a. It has been found that this rotation of the ring with the sheet is the typical mode of operation, entirely absent any conscious design by the user of the binding. In practice, this prevents the sheet 20a which is being manipulated, from being in a position to leave the binding via the slot 11 and, further, as additional sheets 20 are flipped in the counterclockwise direction, following movement of the sheet 20a, the slit 11 has been moved and is no longer in a position to permit egress of any of the sheets from the binding element. Thus, the internal projections 14 and 15 provide a mechanical interlock, in effect preventing any inadvertent disassembly of the sheets from the binding elements. It has been found in general practice that where a plurality of C-rings are employed in a binding, the possibility of all of the slits 11 being aligned to permit removal of a bound sheet, is remote, and for all practical purposes, non-existent.

In a typical ring found satisfactory for binding purposes in accordance with the present invention, the axial length of the ring was ¼ inch, the internal diameter of the ring, shown at 23 in FIG. 1, comprised ⅜ inch and the external diameter comprised approximately ½ inch. The ring, used with aligned paper openings of a width of 3/16 inch, may satisfactorily have ends with a thickness t of approximately 5/32 inch which helps insure hooking contact of the edge 21a by the projection. In the manufacture of such a ring, an initial mold spacing between the ends 14,15 of approximately 15/1000's of an inch, substantially exaggerated in FIG. 5, will provide a complete subsequent closure of the ring upon ejection from mold 25, where thermoplastic materials such as Nylon or Delrin are employed.

A consideration of the mold shown in FIG. 4 illustrates that the cavity takes substantially exactly the form of the C-ring in repose, except for the built-in end separation. The ring is ejected from below, as viewed in FIG. 4 by a plurality of typical mold ejection pins 26. For example, an ejection pin may be provided to move axially of the C-ring and shut against the ends 14 and 15 as well as the back 16. To provide a sufficient plastic material to support an ejection pin at the back 16 of a bulbous protrusion 16a is provided. A very slight mold draft, or relief, of one or two thousandths of an inch is provided to permit ejection of the molded ring, and plastic material may be inserted into the mold cavity as illustrated in FIG. 5 by any conventional means, such as for example, by way of a hole 28 through the mold plate 27 lying flat over the top of the cavity as shown. I have found that molding the C-ring provides clean, sharp, corners without burrs and post-mold shrinkage provides a closed slit and, accordingly, it is preferred that the C-ring be individually molded rather than cut from a length of continuously extruded material. It is noted, however, that transversely cut extrusions, having a cross-section as shown in FIG. 1, can be employed where a less finished product is acceptable, such as where stiff sheets 20 are used.

As mentioned above, it is desired that the ends 14,15 be heavier than the back 16 of the ring. This causes the rings to hang downwardly when carried on a rod or mandrel, such as shown at 30 in FIG. 1, having a diameter less than the diameter 23. In automated binding equipment, the protrusion 16a also aids in achieving and maintaining such an alignment by cooperating with a grooved surface on the supporting mandrel 30. Such binding equipment is the subject of the copending application of Henry N. Staats and Frederick H. Melull, filed of even date herewith.

Various materials, which will shrink during cooling after being molded, are acceptable for the construction of the C-ring of this invention. I have found high molecular weight polyamides (such as Nylon, marketed by E. I. duPont deNemours & Co.), a rigid polyvinyl chloride and Delrin (an acetal resin manufactured by E. I. duPont deNemours & Co., Inc.), satisfactory materials. They are resilient and yet stiff enough to return to their original shape following insertion of sheets. Although the named materials are thermoplastic materials, thermosetting materials may also be employed.

The internally projecting ends 14,15 may take various shapes. The curved hook shape illustrated in the drawings, FIGS. 1,3 and 5, provides optimum performance, however. It has been found that with the surfaces becoming substantially radial adjacent the slit, sheets are hooked and operate to pull, or rotate, the ring rather than ride over the projection. Accordingly, a rather abrupt projection is preferred. Since variations may readily be provided without departing from the scope of my invention, it is intended that the scope of the claims be limited solely by that of the hereinafter appended claims.

I claim as my invention:

1. A method of making a binding element of a resilient plastic material having a circular configuration of a C-ring with a radial slit forming a pair of ends which are closely adjacent each other, said plastic material having a characteristic of shrinking during cooling from a molding temperature, said method comprising providing a mold having a cavity configuration of the element in a spread condition with the adjacent ends spaced apart a distance greater than said slit, molding the element by inserting a plastic material into the mold cavity at a temperature above the melting point of the plastic material, removing the molded element from the mold, and cooling the element to shrink the adjacent ends of the element substantially together.

2. A method according to claim 1, wherein said plastic material is a high molecular weight polyamide.

3. A method according to claim 1, wherein the plastic material is a rigid polyvinyl chloride.

4. A method according to claim 1, wherein the plastic material is an acetal resin.

* * * * *